(12) United States Patent
Durham

(10) Patent No.: US 7,118,302 B1
(45) Date of Patent: Oct. 10, 2006

(54) VEHICLE CLAMP HAVING A VIBRATION DAMPENING INSERT

(75) Inventor: Christopher W. Durham, Butler, PA (US)

(73) Assignee: Oberg Industries, Freeport, PA (US)

( * ) Notice: Subject to any disclaimer, the term of this patent is extended or adjusted under 35 U.S.C. 154(b) by 99 days.

(21) Appl. No.: 10/824,213

(22) Filed: Apr. 14, 2004

(51) Int. Cl.
 *B62K 21/12* (2006.01)
(52) U.S. Cl. ............... 403/344; 403/286; 403/389; 403/388; 280/277; 280/279; 280/276
(58) Field of Classification Search ........... 403/177, 403/191, 196, 234, 235, 290, 385, 389, 364; 280/276, 279, 280
See application file for complete search history.

(56) References Cited

U.S. PATENT DOCUMENTS

| | | | |
|---|---|---|---|
| 4,773,514 A * | 9/1988 | Gustafsson | 188/306 |
| 5,310,203 A * | 5/1994 | Chen | 280/276 |
| 5,829,316 A | 11/1998 | Krizman, Jr. | |
| 5,921,145 A * | 7/1999 | Muser | 74/551.2 |
| 6,035,741 A * | 3/2000 | Krizman, Jr. | 74/551.8 |
| 6,104,099 A | 8/2000 | Mizuta et al. | |
| 6,176,503 B1 | 1/2001 | George | |
| 6,331,089 B1 | 12/2001 | Iteya | |
| 6,332,625 B1 * | 12/2001 | Fukunaga et al. | 280/280 |
| 6,520,524 B1 * | 2/2003 | Costa | 280/276 |
| 6,547,269 B1 | 4/2003 | Lane | |
| 6,712,541 B1 * | 3/2004 | Henricksen | 403/344 |
| 6,802,519 B1 * | 10/2004 | Morgan et al. | 280/272 |

* cited by examiner

*Primary Examiner*—Daniel P. Stodola
*Assistant Examiner*—Nahid Amiri
(74) *Attorney, Agent, or Firm*—Grant E. Coffield; Eckert Seamans Cherin & Mellott, LLC

(57) ABSTRACT

A vehicle clamp which may be a motorcycle clamp includes an elongated body having a pair of spaced fork leg receiving openings and an opening disposed generally between the fork receiving openings for receiving a steering shaft. A pair of spaced handlebar mounts are disposed on opposite sides of the steering shaft opening with each handlebar mount being disposed between a fork receiving opening and the steering shaft opening and a vibration dampening insert interposed between the body and the handlebar mounts. In one embodiment, the vibration dampening insert has a plurality of recesses and a lower portion of the base of the handlebar mounts has a plurality of alternating lands and grooves, with the lands being receivable within the grooves in the dampening insert. The insert serves to dampen engine generated vibrations as well as road created vibrations to minimize transmission of the same to the handlebars.

15 Claims, 4 Drawing Sheets

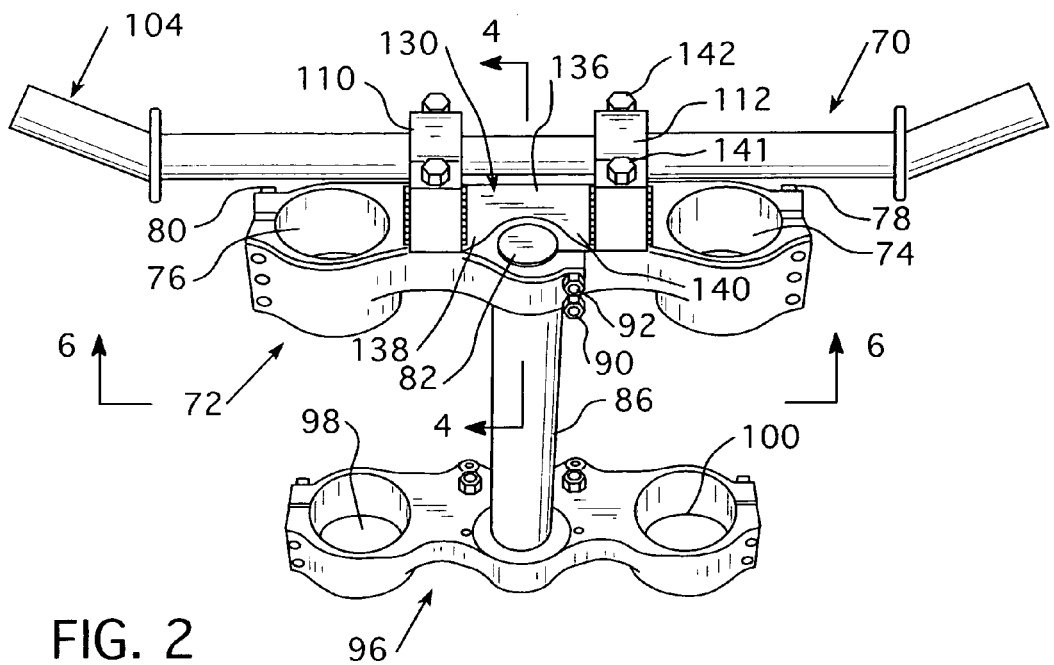
FIG. 2
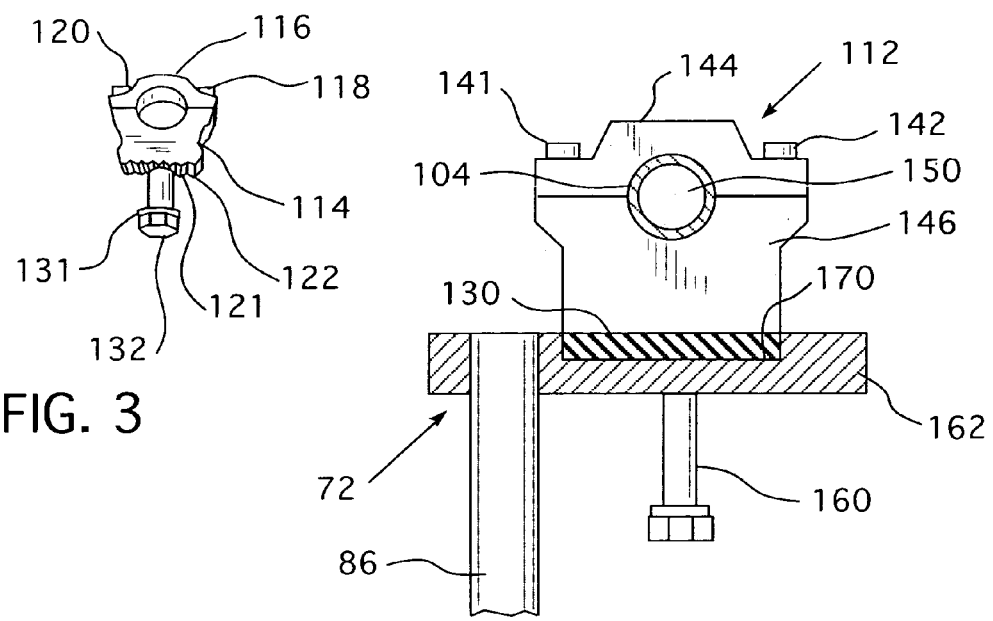
FIG. 3
FIG. 4

# VEHICLE CLAMP HAVING A VIBRATION DAMPENING INSERT

BACKGROUND OF THE INVENTION

1. Field of the Invention

The present invention relates to a vehicle triple clamp which has a vibration dampening insert interposed between the body of the clamp and the handlebar mounts to resist transmission of engine and road generated vibrations to the handlebars.

2. Description of the Prior Art

It has been known that vehicles such as motorcycles generate vibrations which may be transmitted to the handlebars as a result of operation of the engine and on irregularities in the road over which the motorcycle is being driven.

It has been known to provide in riser assemblies, which connect the handlebar to the front fork assembly, rubber bushings at the interface between the riser assembly and the front fork assembly. Other types of bushings seeking to achieve this purpose have been known. See, for example, U.S. Pat. No. 6,547,269.

In spite of the foregoing known systems, there remains a very real and substantial need for an improved vehicle clamp which effectively dampens undesired transmission of vibrations to the handlebars.

SUMMARY OF THE INVENTION

The present invention has met the above described need by providing a vehicle triple clamp. An elongated body has a pair of spaced fork leg receiving openings and an opening disposed generally therebetween for receiving a steering shaft. This results in a triple clamp. A pair of spaced handlebar mounts is disposed on opposite sides of the steering shaft opening and with each being disposed intermediate a fork leg receiving opening and the steering shaft opening. A vibration dampening insert is interposed between the body and handlebar mounts to resist transmission of undesired engine vibrations and on road created vibrations to the handlebars.

The vibration dampening insert is preferably disposed in a cavity in the upper portion of the elongated body. The insert may have a plurality of upwardly open recesses. The handlebar mounts preferably have a base secured to the body and a cap secured to the base to define therebetween a handlebar receiving passageway.

In one embodiment, a lower portion of the base has a plurality of alternating lands and grooves with at least some of the lands being received in the recesses of the vibration dampening insert. The vibration dampening insert may be generally U-shaped and be composed of a resiliently deformable material.

Mechanical fasteners secure the base of the handlebar mount to the elongated body. Mechanical fasteners are preferably employed to secure the caps to the handlebar mount bases.

It is an object of the present invention to provide an improved vehicle clamp wherein a vibration dampening insert is interposed between the handlebar supports and the clamp body.

It is a further object of the present invention to provide such a clamp which is structured to be employed in a conventional manner, while providing the desired vibration dampening benefits.

It is another object of the present invention to provide a durable, economical vehicle triple clamp which will effect substantial reduction of engine and road induced vibration in the handlebars.

It is a further object of the present invention to provide handlebar mounts on such a clamp which are adapted for adjustable, multiple position mounting.

It is another object of the present invention to provide such a clamp which has handlebar mounts which have mating interlocking features which engage corresponding damper plate features to thereby provide an effective mechanical connection therebetween while effecting damping.

It is another object of the present invention to provide for mechanical interlock between the handlebar mounts and the vibration dampening insert while resisting metal to metal contact.

It is yet another object of the present invention to provide such a construction in which the two handlebar mounts resist undesired tortional wind-up and misalignment of the handlebars, while permitting a controlled amount of movement in desired directions.

It is yet another object of the invention to provide such a dampening construction which permits a range of adjustment of the handlebars while maintaining the desired dampening.

These and other objects of the invention will be more fully understood from the following description of the invention with reference to the drawings appended hereto.

BRIEF DESCRIPTION OF THE DRAWINGS

FIG. 2 is a perspective view of a motorcycle triple clamp incorporating features of the present invention.

FIG. 3 is an elevational view showing a form of handlebar mount employable in the present invention.

FIG. 4 is a cross-sectional illustration taken through 4—4 of FIG. 2.

DESCRIPTION OF THE PREFERRED EMBODIMENTS

As employed herein, the term "road" will be employed to refer broadly to the surface on which the motorcycle will be ridden regardless of whether it is a well-defined path such as a paved, gravel or dirt road or an off-road dirt surface on any supporting material including water, snow and ice which provides an operating surface.

As employed herein, the term "vehicle" shall refer to vehicles which may be motorized or not and are structured to travel on a road and shall expressly include but not be limited to motorcycles, all-terrain vehicles, snowmobiles, motorbikes, bicycles and personal watercraft.

Figure 1:
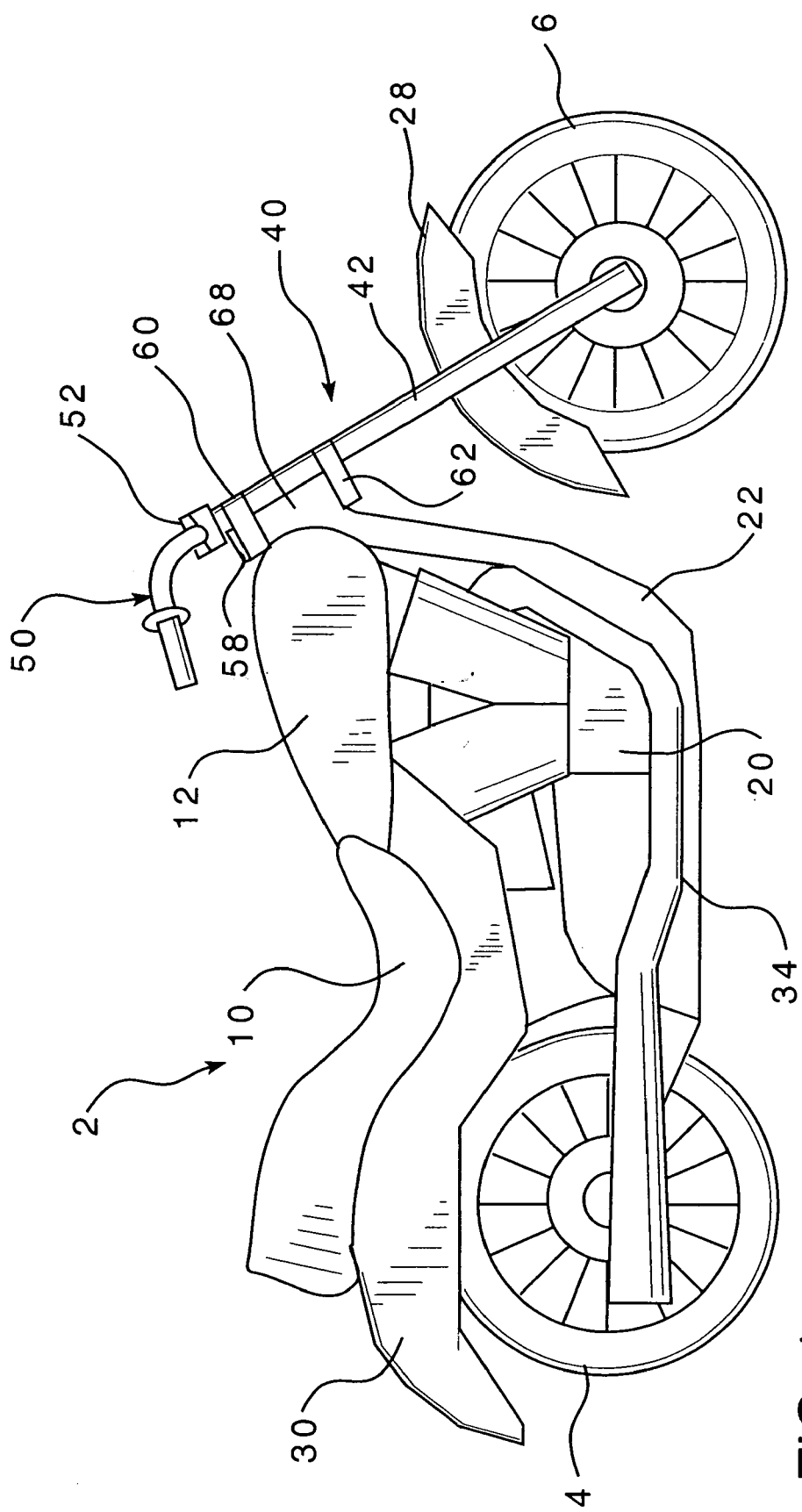
FIG. 1 is a schematic elevational view of a general form of motorcycle.

Referring to FIG. 1, there is shown schematically a general form of known motorcycle 2 having a rear wheel 4, a front wheel 6, a seat 10, a fuel tank 12, an engine 20 and a frame assembly 22. The motorcycle also has a front fender 28 and a rear fender 30, and an exhaust pipe 34 which directs exhaust from the engine 20 rearwardly. A front fork assembly 40 has a pair of legs with one fork leg 42 being shown in FIG. 1 and the other (not shown) being on the opposite side of front wheel 6. Handlebars 50 are secured within a pair of relatively spaced handlebar mounts 52 with the second one not being shown in FIG. 1. Shaft 58 is secured within cross members 60, 62 and passes through tubular steering head 68.

Referring to FIG. 2, there is shown a triple clamp assembly 70 employable in securing the handlebars to the other portions of the steering assembly of the present invention. The upper portion of the assembly 70 has an elongated substantially rigid body portion 72 which has a pair of fork leg receiving openings 74, 76 which have associated mechanical fasteners, respectively, 78, 80 for adjusting the size of the opening so as to provide intimate interengagement between the two fork legs (not shown) and the body portion 72. Disposed generally centrally of the elongated body portion 72 is an opening 82 through which steering shaft 86 passes with mechanical fasteners 90, 92 serving to fixedly secure the shaft 82 to the body 72. The lower portion of steering shaft 86 is fixedly secured as by interference press fit, for example, within second body portion 96 which has openings 98, 100 generally aligned, respectively, with openings 76, 74 for passage of the fork legs therethrough. An elongated handlebar 104 which may have any desired size and shape is secured to the assembly within handlebar mounts 110, 112 which may be generally identical and have the form shown in FIG. 3. The handlebar mounts 110, 112 are preferably substantially rigid and made of a suitable metal such as aluminum. As shown in FIG. 3, the handlebar mount may have a base 114 and a cap 116 secured to the base 114 by mechanical fasteners 118, 120 with the lower portion of the base 114 having a plurality of alternating lands 121 and grooves 122. A washer 131 is employed and mechanical fastener 132 passes through the body 72 and fixedly secures the base 114 thereto. plurality of alternating lands 121 and grooves 122.

Also shown in FIG. 2 is a vibration dampening element 130 which, in the form shown, has a generally flat upper surface. The generally U-shaped insert has a base 136 and a pair of projecting portions 138, 140 with portions (not shown in this view) underlying the base 114 of the respective handlebar mounts 110, 112 with sufficient tightening to place the resiliently deformable vibration dampening insert in compression. It will be appreciated that in this manner vibrations originating within the engine 20 or transmitted from the road will be dampened as a result of there being no rigid connection between the handlebars 104 and the body 72, steering shaft 86 and the fork legs such as 42 (FIG. 1).

The dampening element 130 may, for example, be composed of rubber or a suitable resinous polymer such as polyurethane, for example, in order to provide the desired dampening combined with structural integrity and durability in compression.

Referring to FIG. 4, there is shown handlebar mount 112 which has a pair of mechanical fasteners 141, 142 securing the cap 144 to the base 146 with the handlebar 104 restrained within the generally circular passageway 150 defined between the cap 144 and base 146. Mechanical fastener 160 passes through elongated body 162 and into the base 146 to compress the vibration dampening insert 130 therebetween.

It should be noted that in the form shown an upwardly open cavity designated 170 is provided in the body 162 with the vibration dampening insert 130 being received therein.

In general, the elongated body 72, the lower triple clamp body 96, steering shaft 86 and handlebar mounts 110, 112 will generally be made of a sufficiently strong and durable metal such as aluminum, for example. The mechanical fasteners will generally be bolts such as carriage bolts and made of a material which is durable when exposed to the outdoor environment. They may be protectively coated, such as with zinc for corrosion resistance.

Figure 5:
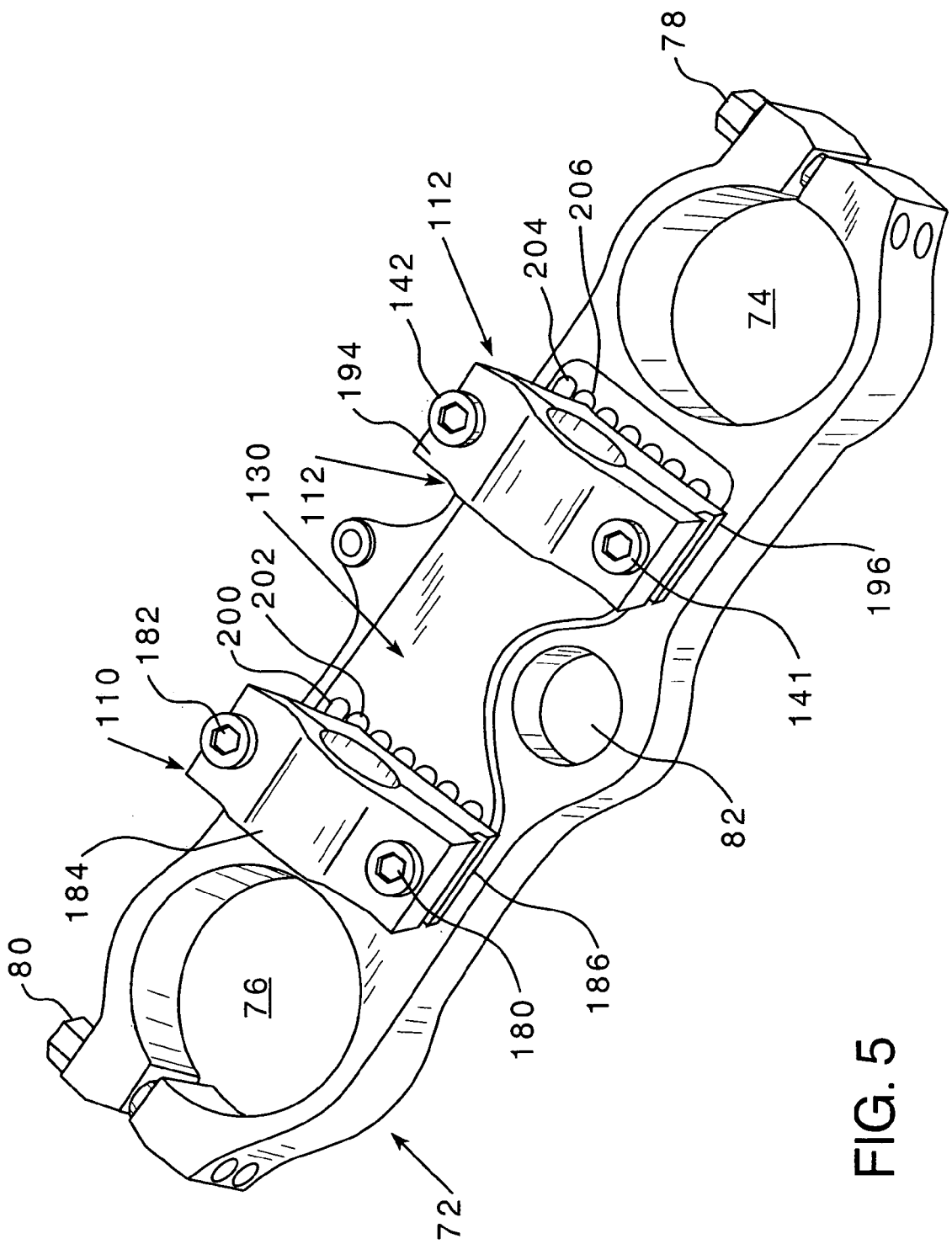
FIG. 5 is a perspective view of a portion of the triple clamp of the present invention viewed generally from above.
Figure 6:
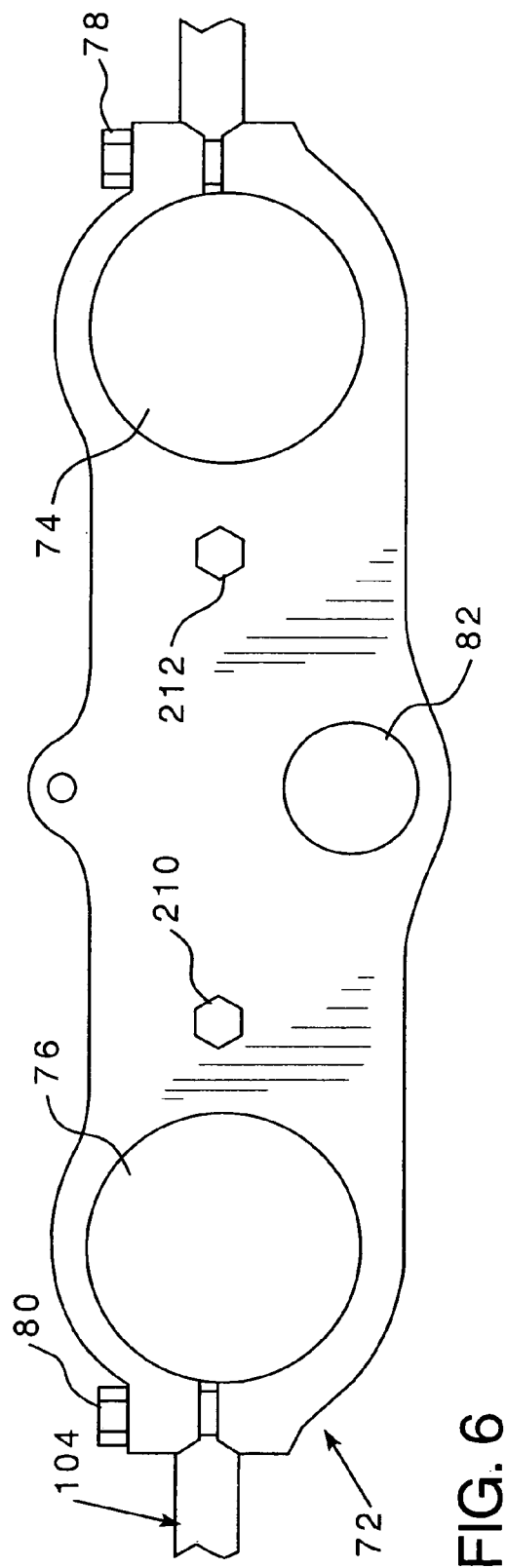
FIG. 6 is a bottom plan view showing a portion of the triple clamp of the present invention taken through 6—6 of FIG. 2.

FIGS. 5 and 6, respectively, show views of the upper and lower portions of the assembly. As shown in FIG. 5, bolts 180, 182 secure the cap 184 of handlebar mount 110 to the base 186. Similarly, bolts 141, 142 secure cap 194 of handlebar mount 112 to base 196. Vibration dampening insert 130 has two series of upwardly open recesses such as 200, 202 and 204, 206 underlying, respectively, bases 186, 196 for reasons which will be described hereinafter. As shown in FIG. 6, bolts 210, 212 pass through the elongated generally rigid body 72 and secure, respectively, bases 186 and 196 to the body 72 with the vibration dampening insert 130 interposed.

Figure 8:
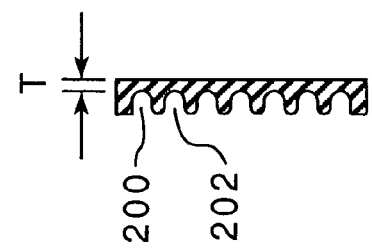
FIG. 8 is a cross-sectional view taken through 8—8 of FIG. 7.
Figure 7:
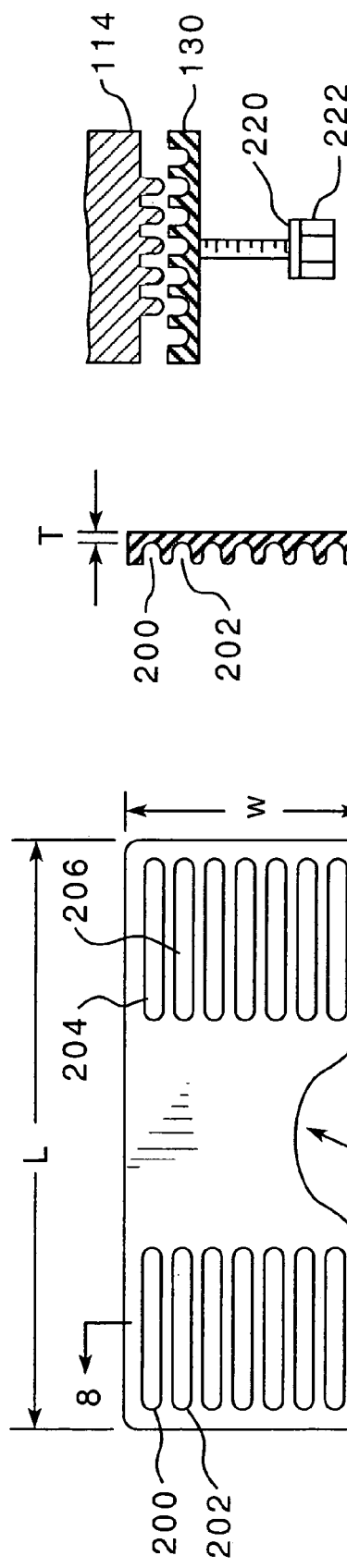
FIG. 7 is an illustration in plan of a vibration dampener insert of the present invention.

Referring to FIGS. 3, 7 and 8, it will be appreciated that the downwardly projecting lands such as 121 of base 114 are so dimensioned as to be receivable within the upwardly open recesses, such as 200, 202, 204, 206 of the vibration dampening insert 130. It will be appreciated that in this manner, intimate interengagement between the handlebar mounts 110, 112, 116 and the vibration dampening insert 130 are provided. The generally U-shape for the insert 130 is provided so as to permit the vibration dampening insert 130 to underlie the two handlebar mounts 110, 112 while maintaining clearance of opening 82 for securement of the steering shaft therein. In general, the insert will have a length L sufficient to underlie bases 186, 196 (FIG. 5) and a width W sufficient to underlie the bases 186, 196. If desired, the insert 130 may be in two more pieces so long as portions are positioned for the designed dampening. The thickness T will depend upon the compressibility of the material, but in general will leave an adequate residual thickness underlying the recesses 200, 202, 204, 206, for example, to maintain the desired dampening. It will be appreciated that, in order to achieve dampening, a portion of the vibration dampening insert should be disposed between the downwardly projecting lands from the base such as 114 (FIG. 3) and the upper surface of the elongated body 72.

Figure 9:
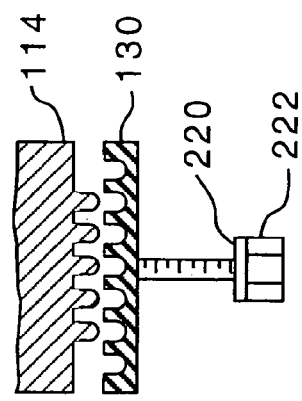
FIG. 9 is a partially exploded elevational view showing a portion of the vibration dampening insert and base of a handlebar mount.

FIG. 9 shows a partially exploded view of the insert 130, the handlebar mount base such as 114 and a washer 220 and bolt 222. The insert 130 preferably has more recesses such as 200, 202, 204, 206 (FIG. 7), for example, than the base 114 (FIG. 9) has lands in order to permit adjustable positioning of the handlebar mounts 114 (FIG. 3) while preserving desired dampening.

It will be appreciated that the present invention provides an effective means for dampening vibration due to engine noise and road conditions between the sources of the same and the handlebars to minimize the transmission of vibrations. All of this is accomplished in a simple and economical manner which does not materially alter the structure or mechanics of the steering assembly of the vehicle.

While for simplicity of disclosure herein specific reference has been made to motorcycles by way of a preferred example, the invention is not so limited and may be employed with a variety of "vehicles" as defined herein.

Whereas particular embodiments have been described herein for purposes of illustration, it will be evident to those skilled in the art that numerous variations of the details may be made without departing from the invention as defined in the appended claims.

The invention claimed is:

1. A vehicle clamp comprising
    an elongated body having an outer upper surface, an inner lower surface, and a pair of spaced fork leg receiving openings,
    said elongated body defining a steering shaft opening disposed generally between said fork leg receiving openings for receiving a steering shaft,
    a pair of spaced handlebar mounts disposed on opposite sides of said steering shaft opening,
    said spaced handlebar mounts each being disposed between said fork receiving openings and said steering shaft opening, and
    a generally thin flat vibration dampening insert directly interposed between said outer upper surface of said body and said handlebar mounts, and said vibration dampening insert substantially completely underlying said handlebar mounts.

2. The clamp of claim 1 including
    said vibration dampening insert being resiliently compressible.

3. The clamp of claim 1 including
    said handlebar mounts each having a base secured to said body and a cap secured to said base to define a handlebar receiving passageway therebetween.

4. The motorcycle triple clamp of claim 1 including
    said body having a cavity within which said vibration dampening insert is received.

5. The clamp of claim 1 including
    said vibration dampening insert having a plurality of recesses, and
    said vibration dampening insert having a generally flat upper surface except for said recesses.

6. The clamp of claim 1 including
    said vibration dampening material being selected from the group consisting of rubber and resinous polymer.

7. The clamp of claim 1 including
    said body and said handlebar mounts being composed of metal.

8. The clamp of claim 1 including
    said clamp being a triple motorcycle clamp.

9. The clamp of claim 4 including
    said vibration dampening insert being generally U-shaped.

10. The clamp of claim 1 including
    said fork leg receiving openings being of adjustable size.

11. The clamp of claim 10 including
    said steering shaft opening being of adjustable size.

12. A vehicle clamp comprising
    an elongated body having a pair of spaced fork leg receiving openings,
    said elongated body defining a steering shaft opening disposed generally between said fork leg receiving openings for receiving a steering shaft,
    a pair of spaced handlebar mounts disposed on opposite sides of said steering shaft opening,
    said spaced handlebar mounts each being disposed between a said fork receiving openings and said steering shaft opening,
    a generally flat vibration dampening insert interposed between said body and said handlebar mounts,
    said handlebar mounts each having a base secured to said body and a cap secured to said base to define a handlebar receiving passageway therebetween,
    a lower portion of said base having a plurality of lands and grooves, and
    said vibration dampening insert having a plurality of recesses for receiving at least some of said lands.

13. The clamp of claim 12 including
    mechanical fasteners securing said bases to said body.

14. The clamp of claim 13 including
    mechanical fasteners securing said caps to said bases.

15. The clamp of claim 12 including
    said handlebar mounts being securable to said vibration dampening insert at a plurality of relative positions depending on which said lands are received by which said recesses.

* * * * *